United States Patent
Kreiner et al.

(10) Patent No.: US 11,792,267 B2
(45) Date of Patent: Oct. 17, 2023

(54) NETWORK-CONNECTED SENSOR DEVICE CRITICAL RULE TRIGGERS FOR ACTIVATING NETWORK-CONNECTED DEVICE FUNCTIONS

(71) Applicant: AT&T Intellectual Property I, L.P., Atlanta, GA (US)

(72) Inventors: Barrett Kreiner, Woodstock, GA (US); James Pratt, Round Rock, TX (US); Adrianne Binh Luu, Atlanta, GA (US); Robert T. Moton, Jr., Alpharetta, GA (US); Walter Cooper Chastain, Atlanta, GA (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 36 days.

(21) Appl. No.: 17/499,174

(22) Filed: Oct. 12, 2021

(65) Prior Publication Data

US 2023/0110032 A1 Apr. 13, 2023

(51) Int. Cl.
| | |
|---|---|
| *H04L 67/12* | (2022.01) |
| *G16Y 20/10* | (2020.01) |
| *G16Y 40/10* | (2020.01) |
| *H04L 67/52* | (2022.01) |
| *H04L 67/025* | (2022.01) |

(52) U.S. Cl.
CPC .............. *H04L 67/12* (2013.01); *G16Y 20/10* (2020.01); *G16Y 40/10* (2020.01); *H04L 67/025* (2013.01); *H04L 67/52* (2022.05)

(58) Field of Classification Search
CPC ....... H04L 67/12; H04L 67/52; H04L 67/025; G16Y 20/10; G16Y 40/10
USPC ......................................................... 709/203
See application file for complete search history.

(56) References Cited

U.S. PATENT DOCUMENTS

| | | | | |
|---|---|---|---|---|
| 9,589,397 | B1 * | 3/2017 | Christopher | .......... H04W 12/06 |
| 9,594,621 | B1 * | 3/2017 | Navilappa | ........... H04L 41/0654 |
| 10,819,556 | B1 * | 10/2020 | Rangasamy | .......... H04L 41/026 |
| 11,190,985 | B1 * | 11/2021 | Indurkar | ............... H04L 63/102 |
| 2002/0054174 | A1 * | 5/2002 | Abbott | ................... G06F 16/40 |
| | | | | 715/863 |

(Continued)

OTHER PUBLICATIONS

Moore, Clayton, "Amazon Alexa's Guard is a new security feature to keep your smart home safe", Digital Trends, May 14, 2019, printed from https://www.digitaltrends.com/home/amazon-alexa-guard-rollout/, 14 pages.

(Continued)

*Primary Examiner* — Tauqir Hussain

(57) ABSTRACT

A network-connected electronic device may obtain, at a location, a notification that a network-connected sensor device at the location is activated in response to a triggering of a critical rule of the network-connected sensor device, determine whether the triggering of the critical rule of the network-connected sensor device will activate a function of the network-connected electronic device, activate the function of the network-connected electronic device in response to the determining that the triggering of the critical rule of the network-connected sensor device will activate the function of the network-connected electronic device.

20 Claims, 3 Drawing Sheets

(56) References Cited

U.S. PATENT DOCUMENTS

| | | | |
|---|---|---|---|
| 2006/0004736 A1* | 1/2006 | Fair | G06Q 10/107 |
| 2013/0086627 A1* | 4/2013 | Bryan | H04L 63/10 |
| | | | 726/1 |
| 2016/0248748 A1* | 8/2016 | Caterino | H04L 63/10 |
| 2016/0352673 A1* | 12/2016 | Flores | H04L 51/52 |
| 2018/0152444 A1* | 5/2018 | Caterino | G07C 9/00174 |
| 2018/0253569 A1* | 9/2018 | Swierk | G06F 21/554 |
| 2018/0292827 A1* | 10/2018 | Artes | G01C 21/362 |
| 2018/0359201 A1* | 12/2018 | Rangasamy | G06F 11/30 |
| 2019/0109725 A1* | 4/2019 | Duraisingh | H04L 12/2812 |
| 2019/0289134 A1* | 9/2019 | Dawes | H04L 63/20 |
| 2020/0349345 A1* | 11/2020 | Hodge | G06Q 30/08 |
| 2020/0351179 A1* | 11/2020 | Wang | H04L 67/12 |
| 2020/0380381 A1* | 12/2020 | Aaron | G06N 20/00 |
| 2021/0103260 A1* | 4/2021 | Khurana | G05B 23/0237 |
| 2021/0344591 A1* | 11/2021 | Kondalam | H04L 12/18 |
| 2022/0058282 A1* | 2/2022 | Ricotta, Jr. | H04L 9/50 |
| 2022/0070407 A1* | 3/2022 | Kale | G06F 21/602 |
| 2022/0121773 A1* | 4/2022 | Obaidi | G06F 21/6245 |
| 2022/0157457 A1* | 5/2022 | Phan | G16H 40/67 |
| 2022/0237996 A1* | 7/2022 | Hodge | G08B 13/19647 |
| 2022/0269823 A1* | 8/2022 | Iyer | G06F 21/6263 |
| 2022/0295134 A1* | 9/2022 | Bhide | G16Y 10/75 |
| 2022/0353373 A1* | 11/2022 | Dawes | H04M 11/04 |
| 2022/0397960 A1* | 12/2022 | Marks | G06F 3/016 |
| 2023/0005312 A1* | 1/2023 | Carter | G07C 9/00912 |

OTHER PUBLICATIONS

Al-Heeti, A., "Android's new Sound Notifications will alert you to 'critical sounds' around you", CNET, Oct. 8, 2020, downloaded from *Android's new Sound Notifications will alert you to 'critical sounds' around you—CNET*, 2 pages.

Kozuch, K., "Apple HomeKit: What is it, and how do you use it?", Tom's Guide, Oct. 13, 2020, printed from https://www.tomsguide.com/us/apple-homekit-faq,review-4195.html, 17 pages.

Touhy, J.P., "If You Get Only One Smart Device, Please Make it This One", Wirecutter, Sep. 16, 2020, downloaded from *If You Get Only One Smart Home Device, Please Make it This One | Wirecutter (nytimes.com)*, 5 pages.

Dormehl, L., "A cardiac arrest-detecting smart speaker could save your life", Digital-Trends, Jun. 20, 2019, downloaded from *This Cardiac Arrest-Detecting Smart Speaker Could Save Your Life | Digital Trends*, 23 pages.

* cited by examiner

NETWORK-CONNECTED SENSOR DEVICE CRITICAL RULE TRIGGERS FOR ACTIVATING NETWORK-CONNECTED DEVICE FUNCTIONS

The present disclosure relates generally to network-connected devices (e.g., Internet of Things (IoT) devices) and more particularly to methods, computer-readable media, and apparatuses for activating a function of a network-connected electronic device in response to determining that a triggering of a critical rule of a network-connected sensor device has occurred in a monitored area.

BACKGROUND

A building management system (BMS) may monitor one or more different physical parameters relating to a building environment, including for example: temperature, humidity, atmospheric pressure, light level, sound level, and so forth. A BMS may include a number of sensors throughout a room, a building, or a group of several buildings. The sensors may also be connected to and managed by an aggregation panel that receives data generated by the sensors. There are numerous building management systems of different vendors and with different data formats. However, with the proliferation of numerous network-connected sensors and other devices (e.g., Internet of Things (IoT) devices), many are not necessarily designed for or integrated within a particular management system.

SUMMARY

In one example, the present disclosure describes a method, non-transitory computer-readable medium, and apparatus for activating a function of a network-connected electronic device in response to determining that a triggering of a critical rule of a network-connected sensor device will activate the function of the network-connected electronic device. For instance, a network-connected electronic device may obtain, at a location, a notification that a network-connected sensor device at the location is activated in response to a triggering of a critical rule of the network-connected sensor device, wherein the network-connected electronic device is distinct from the network-connected sensor device, may determine whether the triggering of the critical rule of the network-connected sensor device will activate a function of the network-connected electronic device, and may activate the function of the network-connected electronic device in response to the determining that the triggering of the critical rule of the network-connected sensor will activate the function of the network-connected electronic device.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
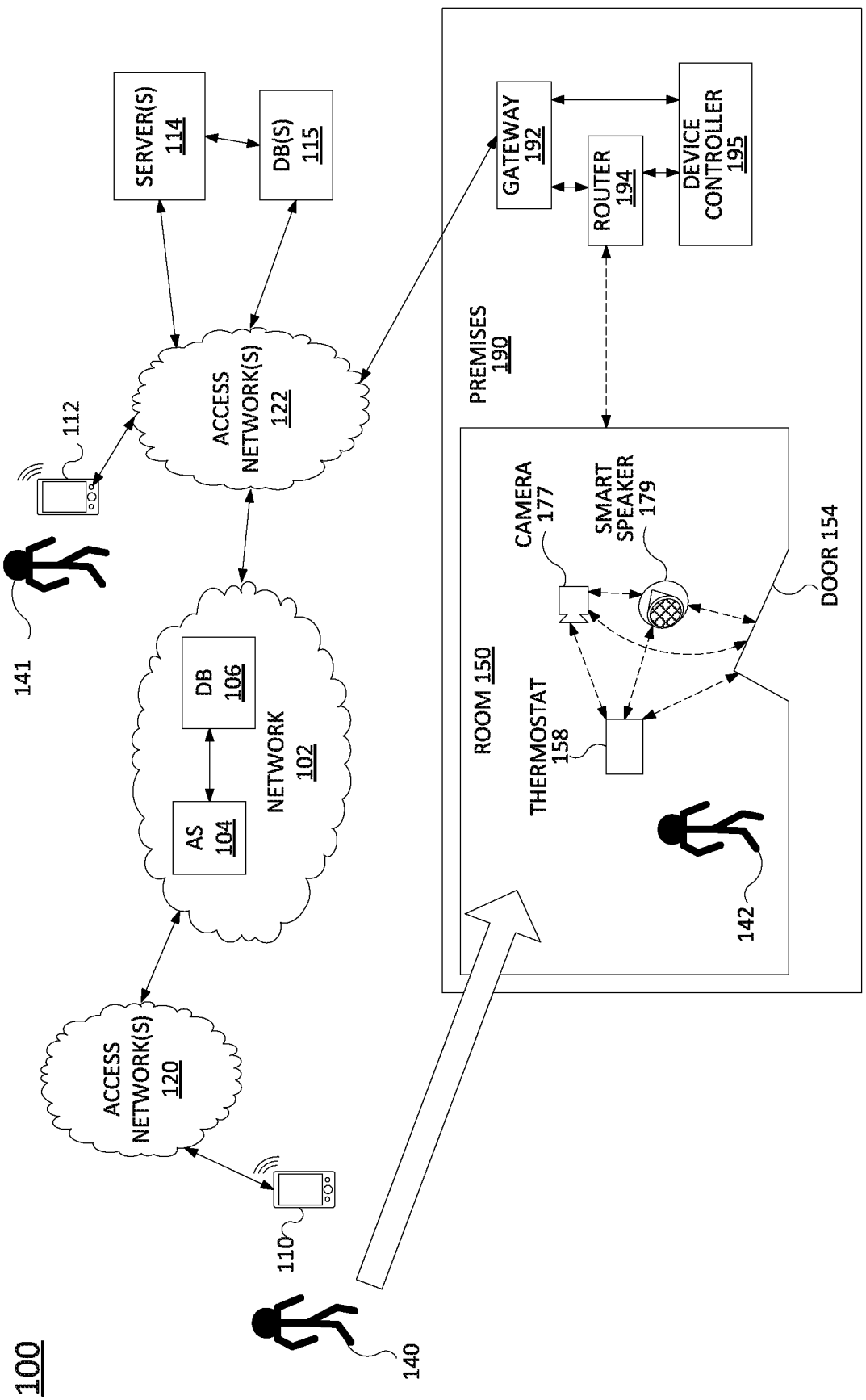
FIG. 1 illustrates an example system comprising one or more communication networks related to the present disclosure.

Examples of the present disclosure include methods, non-transitory computer-readable media, and apparatuses for activating a function of a network-connected electronic device in response to determining that a triggering of a critical rule of a network-connected sensor device has occurred in a monitored area. For instance, multiple network-connected electronic devices may all be deployed at a location (broadly a monitored area), such as a room of a house, a hotel room, and so forth. At least one of the network-connected electronic devices (e.g., IoT devices) may comprise a network-connected sensor device. In accordance with the present disclosure, the network-connected electronic devices at the location may be in communication with one another via peer-to-peer wireless links and/or via a wired or wireless local area network (LAN). In one example, the network-connected electronic devices may perform functions in accordance with respective operational rules of each of the network-connected electronic devices. For instance, the operational rules may include privacy rules, energy conservation rules (or energy consumption rules), activation rules, deactivation rules, transmission of sensor data rules, configuration rules, update rules, and so forth. In addition, in accordance with the present disclosure, a network-connected sensor device may include one or more critical rules, which may supersede non-critical operational rules of the network-connected sensor device. For instance, a critical rule may comprise a high priority safety rule, whereas a non-critical operational rule may comprise a privacy rule, a user preference rule (e.g., for an on-off schedule, an open close schedule, or the like), a power usage rule, and so forth. In some scenarios, the high priority safety rule may directly contradict a non-critical operational rule.

In one example, triggering of a critical rule of one network-connected sensor device may cause the activation of one or more functions of another network-connected sensor device (or other network-connected electronic devices, e.g., one that does not necessarily comprise a "sensor"). In particular, the network-connected electronic devices (e.g., including the at least one network-connected sensor device) may be in communication with each other and may share operational statuses. Thus, for example, a network-connected electronic device may learn whether its peer network-connected electronic devices are on or off, are in an inactive state (e.g., off or standby) or active state of data collection or active state of monitoring of a location, and so forth. In one example, a network-connected electronic device may detect that a peer network-connected sensor device may have been activated and may query the network-connected sensor device as to whether it has activated itself in response to a critical rule trigger. In another example, a network-connected sensor device that activates itself in response to a critical rule trigger may send a proactive notification (e.g., a broadcast notification) to one or more peer network-connected electronic devices located in the monitored area, which may therefore learn of the change in the status of the network-connected sensor device in this way.

In an illustrative example, a network-connected electronic device may be "on" (e.g., in a powered-on state), but may not actively be engaging in a function of the network-connected electronic device, e.g., in a sleep mode or a standby mode. For instance, if the network-connected electronic device itself comprises a network-connected sensor device, it may not be actively engaged in sensor data collection, storage, and/or transmission. For example, a camera may be powered-on and may communicate with other devices via one or more networks or peer-to-peer wireless links, but may not be capturing, storing or streaming images or videos. For example, the camera may be in a standby state and not actively collecting data based upon a privacy rule that the camera should not collect images or videos when hotel guests are in a hotel room, when a room has been reserved by a guest, and so on.

At some time, the camera may obtain notification that a critical rule of a peer network-connected sensor device has been triggered and is actively collecting its own sensor data and/or performing a function that is in direct conflict with a non-critical operational rule. For example, the network-connected sensor device may comprise a smart speaker in a standby state that does not store or transmit audio data, but which may locally scan captured audio data for detecting one or more activation sequences (e.g., wherein when an activation sequence is not detected, the captured audio data is immediately discarded). For example, an activation sequence may comprise a specific wake word or phrase, may comprise a specific speaker's voice, or the like. In one example, a critical rule for a smart speaker may comprise one or more additional sequences (e.g., sounds or combinations of sounds) that may cause the activation of the smart speaker (and which may override/supersede any other non-critical operational rules). For instance, a sound of a human scream, a gunshot, an explosion, breaking glass, or the like may comprise a critical rule, and a trigger of such a critical rule may comprise a detection of such a sound. Similarly, detection of an utterance of "call 9-1-1," "help," "help" over a threshold sound level, the repetition of the word "help," or the like may also comprise a critical rule, and a triggering of the critical rule may comprise a detection of such utterance. For example, a smart speaker may have an operational rule that it is only to respond to a voice of a device owner or a registered owner. However, the critical rule may be such that any person screaming the word "help" or the phrase "call 9-1-1" may cause the smart speaker to change state and to begin actively recording and/or transmitting captured audio and/or establishing a communication session with a 9-1-1 service, irrespective of the identity of the person uttering such word or phrase.

As noted above, the camera may receive notification that the peer network-connected sensor device (e.g., the smart speaker) has received a critical rule trigger, or may determine that the smart speaker has become active and started to collect and/or transmit audio data, may query the smart speaker as to whether a critical rule has been triggered, and may receive a response confirming that the critical rule has been triggered. The camera may then determine whether the triggering of the critical rule of the smart speaker will in turn cause itself to activate one of its own functions (e.g., to begin capturing and/or transmitting images and/or videos, where the camera was previously in an inactive state having not received any triggers to activate any of its functions). In one example, the camera may maintain a peer device critical rule table, or list. For instance, the table may indicate for each critical rule of each peer-device, a corresponding action for the camera to take when the camera is in an inactive state in accordance with at least one operational rule of the camera (e.g., either to activate a function of the camera, e.g., to collect images or videos, or to remain in the inactive state, e.g., to do nothing in response to the critical rule trigger of a peer device). In one example, a default response may be for the camera to activate a recording and/or transmission function (e.g., to violate the camera's own operational rule(s) which would otherwise indicate for the camera to be in the inactive state) in response to learning of the critical rule trigger of a peer device, such as the smart speaker.

In one example, the camera may send a notification to a management system (e.g., an application server, a mobile computing device of an owner of the camera, an owner or operator of a house, hotel, or other venues of the location (monitored area) in which the smart camera and smart speaker are both deployed, etc.). In one example, a confirmation or correction of the action of the camera in response to the critical rule trigger of the smart speaker may be provided via the management system. For instance, a homeowner may prefer that the camera stay in the inactive state, regardless of how significant of an emergency may be indicated by the critical rule trigger of the smart speaker (and/or of critical rule triggers of other network-connected sensor device). Thus, the camera may update an entry in its peer-device critical rule table to indicate that for the critical rule trigger of the smart speaker, to take no action. Accordingly, in future instance in which the camera learns of the critical rule trigger of the smart speaker, if the camera is in the inactive state, the camera will not active and record and/or transmit images or videos.

In one example, when the camera determines to activate in response to the critical rule trigger of the smart speaker (and to supersede the camera's own operational rules), the camera may not simply store and/or transmit images or videos. For instance, in one example, the sensor data of the camera (e.g., images and/or videos) may be encrypted prior to storage or transmission, where the sensor data may only be accessed in usable form with an encryption key (where "encryption key" includes any key that is able to decrypt the sensor data into an original form, a human accessible form, or otherwise usable form (e.g., for machine learning (ML)-based analysis, or the like)). For example, the sensor data may be stored as factual evidence of an occurrence at the location, but may be practically inaccessible unless and until an encryption key is obtained and used to access the sensor data. To illustrate, in one example, the use of the encryption key may cause an accessing of the sensor data to be recorded along with details of the access, e.g., an identifier of a user and/or a device via which the sensor data is accessed, a time of access, a duration of the access, etc. Thus, an unauthorized access of the encrypted sensor data may be memorialized for auditing (and similarly for any authorized access).

In one example, the camera may not immediately begin recording and/or transmitting in response to the triggering of the critical rule of the smart speaker. Rather, in one example, the camera may place itself in the active/ready state in which the camera may allow authorized remote devices or systems to request activation of the camera's recording function. For instance, the camera may be in an inactive state during overnight hours (e.g., according to a scheduling rule, a power conservation rule, etc.) and in addition, the same or different rule may indicate that remote requests to activate the camera should be denied during such hours. Thus, in general, the camera would deny such a request. However, in response to the critical rule trigger of the smart speaker, the camera may enter the active/ready state in which the camera may allow authorized remote devices or systems to request activation of the camera's recording function. In addition, if such a request were to be received, the camera would comply with the request and record and/or transmit image data (e.g., images and/or video) (in contravention of the camera's own operational rule(s) which would cause such requests to be denied during overnight hours).

Similarly, examples may include a smart camera that is in a standby state and that is scanning images and/or video only for critical rule triggers (e.g., detection of "fire" via a machine learning based detection model, or the like). When such a critical rule is triggered, the camera may then begin actively recording and/or transmitting images and/or video. In addition, the camera may transmit a notification of the critical rule trigger to one or more other network-connected electronic devices, or the other network-connected electronic devices may otherwise learn of the critical rule trigger of the camera. For instance, a smart speaker may become aware that the camera has been activated in response to a critical rule trigger. In addition, the smart speaker may then determine to activate itself in response to the critical rule trigger of the camera (e.g., where the smart speaker is in an inactive/idle state in accordance with one or more operational rules of the smart speaker). For example, if a fire is detected, the camera may be configured to override privacy and/or other rules in effect and to begin recording images and/or videos. In accordance with the present disclosure, the smart speaker's own critical rule(s) has/have not been triggered, but may nevertheless activate itself in response to the camera's critical rule trigger. For instance, the smart speaker may begin recording and/or transmitting audio data, may enable a two-way conversation via the smart speaker and one or more remote devices or systems, and so forth. Thus, for example, if any person is present at the location and may be in need of assistance, the person may be heard by emergency services personnel, a building manager, or the like. In another scenario, snoring can be heard which may indicate that the occupant is asleep and not aware of the potentially dangerous situation. Alternatively, or in addition, even if no human is present, an emergency responder may be better equipped to enter the location having both video and audio from the location. For instance, a sound of a strong breeze may indicate an additional level of danger in addressing a fire at the location.

Still another example may be a critical rule trigger of a detection of the sound of breaking glass via a smart speaker, where a camera may learn of and activate itself in response to the critical rule trigger. Thus, for example, a homeowner, a building manager, an emergency responder, etc. may be better equipped to address the situation of a broken window with additional visual data, which may indicate the presence of a burglar for instance, or which may indicate that the room appears to be empty (for instance, the window may have been simply broken by a baseball from children playing in a nearby yard or a bird strike).

As noted above, in one example, network-connected electronic devices may provide notifications of their actions taken (e.g., in response to critical rule triggers of other peer network-connected sensor devices) and may receive instructions to either continue with such actions, or to change the response(s) to one or more critical rule triggers of peer network-connected sensor devices (such as to take no action in the future and remain in an idle, non-active, or similar state). For instance, instructions may be provided to make the network-connected electronic devices aware of the potential effects of their actions so as to revise their behavior. The behaviors may be related to actions taken such as data collected by the device, sensors used by the device, and/or actions issued by the device. It should be noted that examples of the present disclosure may relate to monitoring a physical space that has privacy requirements, such as a hotel room or other rental lodging units. However, the examples described may be applied to other public or non-public locations, e.g., an educational institution like a school, a medical facility such as a hospital or nursing home, and the like.

In one example, a physical space, such as a hotel room or other rental accommodations, may be classified as being private or semi-private when occupied by a customer. For example, when occupied, privacy rules may be defined and stored in a rules database (e.g., by a management server) that all sensing devices located within the space are deactivated (private). Or, optionally, all devices may be deactivated except a smart speaker device that may respond to only specific customer requests for customer service or other information (semi-private). In one example, when the space is not occupied by a legitimate customer, the space may be classified as "monitorable." This may be the case, for instance, where sensing devices within the space may be used for purposes that would not intrude upon customer privacy—for example for security monitoring, or monitoring of maintenance staff's activities within the space.

Each participating sensor or other network-connected electronic devices within the space may therefore be assigned privacy rules or other rules that define the behavior that the device should maintain. The rules may vary over time based on conditions. In this illustrative example, the rules applied may vary based on whether "private," "semi-private," or "monitorable" conditions exist. The network-connected electronic devices may have at least some ability to function autonomously. That is, each network-connected electronic device has some ability to perform actions independent of a specific external instruction to do so. For instance, a network-connected electronic device may learn over time through artificial intelligence, and/or machine learning or other techniques, ways to perform more accurately or more efficiently within the specific monitored space, and may apply those learnings, thus taking different actions based on its own decisions. Such learned behaviors can be emphasized (positive feedback) or deemphasized (negative feedback) by a management server or system.

In an example of a hotel, a user/customer may have a smart device with an electronic key, or a separate electronic key (e.g., a radio frequency identification (RFID) card, or the like) used to access a room for a period of time. Upon entry, the classification of the space may change from "monitorable" to "semi-private." Further, if the customer opts-out of using a smart speaker, such as by speaking a command for the smart speaker to turn itself off, the classification of the space may change to "private." These settings may remain as long as the smart device (with location-aware capabilities) and/or electronic key remain within the space.

Each network-connected electronic device within the space may be configured to report all events relevant to its actions to an event database. Each event may record at least a timestamp, an identification of the network-connected electronic device recording the event, an identifier of the type of action, and a source of the instruction to perform the action or other triggers which caused the action. This trigger/source may be used to determine whether the network-connected electronic device was instructed by an external source to perform the action or whether the device autonomously performed the action. A management server may compare the privacy rules in effect based on the classification of the space during a given time period with events that occur within that time period. The management server may continually receive event data and compare the events with allowable activities during the period of time, e.g., as indicated by the privacy or other rules in effect.

For instance, a camera activation during a time when the space has a classification of "private" may directly violate a privacy rule. When the server identifies a rule violation, the server may further examine the event record to determine the source of the instruction or other triggers that caused the network-connected electronic device to perform the action. For instance, as noted above, the source, or the trigger, may be recorded in an event record. A source of an instruction may be for example: an external sender (e.g., an externally-received instruction from a specified sender, such as a single request message), an externally-received embedded code from a specified sender (e.g., an operating system software update), a natively-installed embedded code (e.g., operating system code), an internal code generated by internal device learnings (e.g., modified instructions that are self-written by AI code native to the device), and so on.

In one example, the event record may indicate that the action was performed in response to a critical event trigger of a peer network-connected sensor device. In such case, the management server may dismiss the event record. Alternatively, the management server may flag the event record (and the corresponding action) for a confirmatory input. For instance, a device owner, a property manager, a supervisory user, etc. may indicate that the network-connected electronic device was correct to take the action (e.g., to activate in response to the critical rule trigger of the peer network-connected sensor device) or was incorrect to take such action (e.g., it is preferred that the network-connected electronic device does not activate itself, even when obtaining notification that a peer network-connected sensor device has had a critical rule trigger).

Upon completing this analysis of the rule violation, the management server may send a data message to the network-connected electronic device containing an instruction for future device behavior. For instance, in the event that the instruction is to inform the network-connected electronic device of an incorrect action, the instruction may comprise or may be included in a message that notifies the network-connected electronic device that it violated a rule, and that may contain data describing the rule violation, a potential harm to person or property, and a potential harm type. The data in the instruction or message may be learned by the network-connected electronic device and may therefore be used to invoke new safeguards since it is now aware of the potential impacts of an improper event execution. The level of new safeguards to take may be dependent on the potential harm of the violation. For example, if a camera receives a subsequent request from any source to turn on while the space is in a "private" or a "semi-private" condition, the camera's code may be self-updated to deny the request, even if another device has a critical rule trigger that the camera is aware of. For instance, in the example of the hotel room, if the camera receives a request to activate, the camera, according to its configuration code, may first query a reservations database to determine if a customer has checked in and if so, the camera is not activated, even if the camera has received a notification of a critical rule trigger of say a smart speaker. For example, upon checking in to a hotel, a guest may indicate a preference for no camera activation, even in an emergency that may be indicated by a critical rule trigger of a smart speaker. Thus, the guest may be allowed to opt out of this additional level of safety that would otherwise be enabled by the camera self-activating in response to the critical rule trigger of the smart speaker. This option allows the guest's privacy preference to be followed faithfully.

In one example, a correction applied to one device may serve to the benefit of other devices. For instance, a management server may maintain or may have access to a database containing addresses for some other or all other comparable devices that have been registered with the database. Upon determination of a confirmatory or corrective instruction, the management server may send the message, including the lesson, to all applicable devices, or some subset thereof, for example all of those that are registered as owned by a given owner, such as a given hotel operator. In one example, a guest's preferences may thus be provided to network-connected electronic devices at other rooms and/or at other hotels of the same operator, e.g., for future stays by the guest, etc. These and other aspects of the present disclosure are described in greater detail below in connection with the examples of FIGS. 1-3.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102 (e.g., a telecommunication network of a telecommunication service provider). The network 102 may be in communication with one or more access networks 120 and 122, and the Internet (not shown). In one example, network 102 may combine core network components of a cellular network with components of a triple-play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video-on-demand (VoD) server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an Institute of Electrical and Electronics Engineers (IEEE) 802.11/Wi-Fi network and the like), cellular access networks, 3$^{rd}$ party networks, and the like. For example, the operator of network 102 may provide a broadband Internet access service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental, or educational institution LANs, and the like. In one example, one or more of access network(s) 122 may be associated with a premises 190.

In one example, the access networks 120 may be in communication with one or more devices, e.g., device 110. Similarly, access networks 122 may be in communication with one or more devices, e.g., device 112, servers 114, DB(s) 115, gateway 192, etc. Access networks 120 and 122 may transmit and receive communications between devices 110 and 112, server(s) 114, gateway 192, application server (AS) 104 and/or other components of network 102, devices reachable via the Internet in general, and so forth. In one example, each of the devices 110 and 112 may comprise any single device or combination of devices that may comprise an endpoint device, e.g., a client device. For example, the devices 110 and 112 may each comprise a mobile device, a cellular smart phone, a laptop, a tablet computer, a desktop computer, a wearable computing device (e.g., a smart watch, a smart pair of eyeglasses, etc.), an application server, a bank or cluster of such devices, or the like.

In one example, device 110 may be associated with a user 140 (e.g., a renter/guest staying in room 150 at a premises 190) and device 112 may be associated with another user 141, e.g., an owner or manager of premises 190, or the like. For instance, device 110 may have an application (app) installed thereon, which may facilitate making a room reservation/rental, selecting features/amenities to be used, checking in and checking out at a time of the rental, and so forth. Similarly, device 112 may have an application installed thereon for managing the premises 190, receiving alerts/notifications of network-connected electronic device actions, rule violations, etc. In one example, either or both of devices 110 or 112 may include one or more radio frequency (RF) transceivers (as well as antenna(s), and/or other components) for cellular communications and/or for non-cellular wireless communications, such as for IEEE 802.11 based communications, IEEE 802.15 based communications, and so forth.

Figure 3:
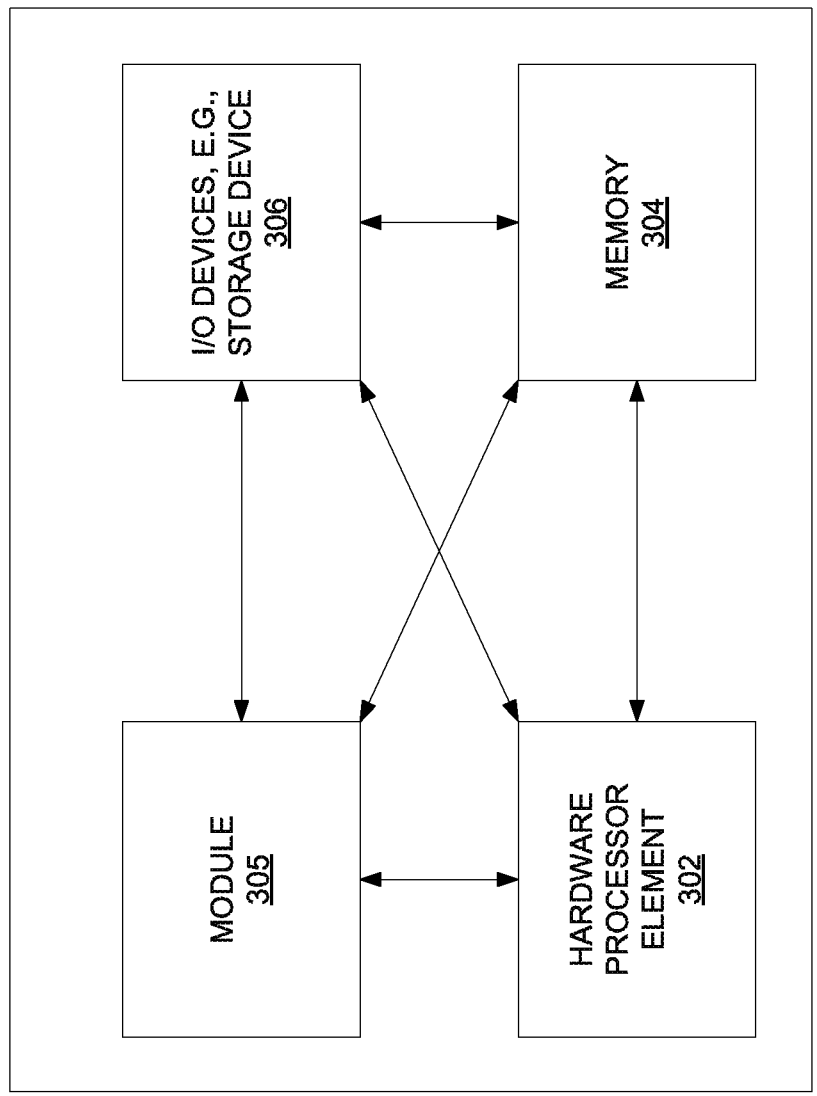
FIG. 3 illustrates a high level block diagram of a computing device specifically programmed to perform the steps, functions, blocks and/or operations described herein.

In one example, devices 110 and 112 may each comprise a computing device or processing system, such as computing system 300 depicted in FIG. 3, and may be configured to provide one or more operations or functions in connection with examples of the present disclosure for activating a function of a network-connected electronic device in response to determining that a triggering of a critical rule of a network-connected sensor device has occurred in a monitored area. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 3 and discussed below) or multiple computing devices collectively configured to perform various steps, functions, and/or operations in accordance with the present disclosure.

Similarly, server(s) 114 may each comprise a computing system or server, such as computing system 300 depicted in FIG. 3, and may be configured to provide one or more operations or functions in connection with examples of the present disclosure for activating a function of a network-connected electronic device in response to determining that a triggering of a critical rule of a network-connected sensor device has occurred in a monitored area, e.g., as described in connection with FIG. 2. For instance, server(s) 114 may provide a premises monitoring and management service (e.g., a "premises monitoring and management system") in accordance with the present disclosure. In one example, database(s) 115 may represent one or more centralized or distributed file systems, e.g., a Hadoop® Distributed File System (HDFS™), or the like. Server(s) 114 may receive and store information in database(s) 115 relating to different users, such as user 140, different premises, such as premises 190, the features/amenities of such properties, available network-connected electronic devices (including network-connected sensor devices), operational rules of the network-connected electronic devices, the rentals/reservations of such premises and their features/amenities, the usage of the premises and their features/amenities, including room conditions (such as private, semi-private, monitorable, or the like), any rule violations, charges and payments for the use of the premises and/or their features/amenities, usage/action reports, and so forth. In one example, server(s) 114 may establish communications with gateway 192 and/or devices within premises 190 periodically or on another basis to obtain and update all or a subset of the information maintained in database(s) 115 relating to the premises 190.

In one example, AS 104 may comprise a network-based server (or servers) providing a premises monitoring and management service (e.g., a "premises monitoring and management system"). In this regard, AS 104 may comprise the same or similar components as server(s) 114 and may provide the same or similar functions, or at least a portion thereof. For instance, an operator of network 102 may provide a premises monitoring and management service via AS 104 in accordance with the present disclosure (e.g., in addition to telecommunication services such as TV, phone, internet access, etc., as described above). Accordingly, DB(s) 106 may be the same as or similar to DB(s) 115 and may store the same or similar information. Thus, although the following examples are described primarily in connection with server(s) 114, it should be understood that the descriptions may equally apply to AS 104.

In one example, premises 190 may include a gateway 192 (e.g., a home gateway, an optical networking unit (ONU)/optical networking terminal (ONT), or the like), which receives data/communications associated with different types of media, e.g., television, phone, and Internet, and separates these communications for the appropriate devices. Gateway 192 may similarly receive and forward outbound communications from devices at premises 190. In one example, television data is forwarded to set-top boxes (STBs)/digital video recorders (DVRs) to be decoded, recorded, and/or forwarded to television(s) for presentation. In addition, telephone data is sent to and received from one or more telephones. It should be noted that for ease of illustration, STBs/DVRs, televisions, and telephones are omitted from FIG. 1. Similarly, Internet communications are sent to and received from router 194, which may be capable of both wired and/or wireless communication. In turn, router 194 may receive data from and send data to the appropriate devices, e.g., device controller 195, camera 177 (e.g., a "smart" camera), smart speaker 179, thermostat 158 (e.g., a temperature sensor), door 154 (e.g., an electronically-controlled door), and so forth. In one example, router 194 may further communicate with a user device such as device 110 of user 140 (e.g., a guest staying in room 150). In one example, router 194 may comprise a wired Ethernet router and/or an IEEE 802.11 (Wi-Fi) router, and may communicate with respective devices in or at premises 190 via wired and/or wireless connections. In this regard, it should be noted that various features of premises 190 may comprise "smart" appliances (e.g., network-connected devices/Internet of Things (IoT) devices), with wired and/or wireless networking/communication capability. Thus, such appliances may be remotely programmed or configured, and may communicate operational data to remote devices via one or more networks or network links. For instance, each of these devices may include a transceiver for IEEE 802.11-based communications, for IEEE 802.15-based communications, for wired communications, e.g., for wired Ethernet, and so forth.

In accordance with the present disclosure, network-connected electronic devices, e.g., smart camera 177, smart speaker 179, smart thermostat 158, smart door 154, or the like, within room 150 may be in communication with one another via peer-to-peer wireless links and/or via a wired or wireless local area network (LAN). In one example, the network-connected electronic devices may perform functions in accordance with respective operational rules of each of the network-connected electronic devices (e.g., where at least some of the network-connected electronic devices, e.g., network-connected sensor devices, may have one or more critical rules). In addition, each of the network-connected electronic devices may comprise a computing system, such as computing system 300 depicted in FIG. 3, and may be configured to perform operations for activating a function of a network-connected electronic device in response to determining that a triggering of a critical rule of a network-connected sensor device is to instantiate the activation of the function of the network-connected electronic device, e.g., as described in connection with FIG. 2.

In one example, premises 190 may include device controller 195. In one example, the device controller 195 may comprise a computing system, such as computing system 300 depicted in FIG. 3, and may be configured to provide one or more functions in connection with examples of the present disclosure for activating a function of a network-connected electronic device in response to determining that a triggering of a critical rule of a network-connected sensor device has occurred in a monitored area, such as illustrated in FIG. 2 and described below. As illustrated in FIG. 1, device controller 195 may be in communication with various network-connected devices/appliances at premises 190. In this regard, device controller 195 may also include a transceiver for IEEE 802.11-based communications, for IEEE 802.15-based communications, for wired communications, e.g., for wired Ethernet, and so forth. It should be noted that as described herein, functions of device controller 195 may similarly be performed by server(s) 114, and vice versa. However, for illustrative purposes, examples are described primarily in connection with server(s) 114.

In an illustrative example, user 140 may have a reservation for room 150 for a given period of time. Accordingly, user 140 may arrive at room 150 and may access the room 150, e.g., with a passcode provided to user 140 at device 110, a physical key provided to user 140 in some manner, etc. In the present example, user 140 may also be accompanied by another user 142 (e.g., another family member, etc.). In one example, the entrance into the room 150 may be detected via the door 154, e.g., including an electronic trip/break or contact sensor, a magnetic sensor or reader, an optical sensor or reader, etc. In one example, the opening of the door 154 and/or the presence of guests in the room 150 (e.g., user 140 and/or 142) may be communicated to device controller 195 and/or server(s) 114, which may determine that the status change is indicative of the use of room 150. In such case, the server(s) 114 may determine the condition of the room has changed from "monitorable" to "semi-private" (e.g., where smart speaker 179 is to be "active" and camera 177 is to be "inactive") or "private" (e.g., where both camera 177 and smart speaker 179 are to be "inactive").

It should be noted that in one example, the server(s) 114 and/or device controller 195 do not determine the condition/status of the room 150 and then instruct devices as to which state(s) to be in. Rather, the devices themselves may operate according to their respective configurations. For example, as noted above, network-connected electronic devices within room 150 may be in communication with one another via peer-to-peer wireless links and/or via a wired or wireless local area network (LAN). In addition, these network-connected electronic devices may share notifications with each other regarding device statuses/conditions, actions taken, and so forth. Thus, one of the network-connected electronic devices may take actions and/or place itself in an operational state, change operational states, etc. based upon notifications from one or more other network-connected electronic devices. For instance, when the door 154 is opened, the door 154 may notify the camera 177 and smart speaker 179. In turn, camera 177 may place itself in an operational state or standby/inactive, and smart speaker 179 may place itself in an operational state or standby/inactive, e.g., according to the respective configurations of the camera 177 and smart speaker 179. In another example, smart speaker 179 may place itself in an operational state of "active" or may remain in such operational state. However, user 140 and/or user 142 may, upon entering the room 150, speak a command such as "smart speaker turn off" to cause smart speaker 179 to place itself in a standby/inactive state.

In one example, the standby/inactive state of the camera 177 may comprise a state in which the camera 177 is powered-on and capturing image data (e.g., images and/or videos). Alternatively, the image data is only processed locally on the camera 177 to detect certain conditions from the image data (e.g., associated with a critical rule, such as a condition of "fire"), and when such conditions are not detected, the image data is immediately discarded (e.g., the data is not saved to disk/storage, the data is flushed from memory or allowed to be overwritten in memory, etc.). Similarly, the standby/inactive state of smart speaker 179 may comprise a state in which the smart speaker 179 is powered-on and capturing audio data, but where the audio data is only processed locally on the smart speaker 179 to detect certain conditions from the audio data, e.g., a wake word or phrase, or certain words, phrases, sounds, or sound sequences associated with a critical rule, as described herein.

In an illustrative example, camera 177 may be in an inactive/standby state and may be scanning image data only for critical rule triggers (e.g., detection of "fire" via a machine learning based detection model, or the like). When such a critical rule is triggered (e.g., when "fire" is detected in the image data in accordance with the detection model), the camera 177 may then begin actively recording and/or transmitting the image data (e.g., streaming the image data to server(s) 114, device 112 of user 141, etc.). In addition, the camera 177 may transmit a notification of the critical rule trigger to one or more other network-connected electronic devices, such as to smart speaker 179 within the monitored area. In one example, smart speaker 179 may then determine to activate itself in response to the critical rule trigger of the camera 177 (e.g., where the smart speaker is in an inactive/idle state in accordance with one or more operational rules of the smart speaker 179). For example, if a fire is detected, the camera 177 may be configured (i.e., camera 177 has a "critical rule") to override its own internal privacy and/or other rules in effect and to begin recording image data. In addition, while the smart speaker 179 has not had its own critical rule(s) be triggered, it may nevertheless activate itself in response to becoming aware of the critical rule trigger of camera 177. For instance, the smart speaker 179 may being recording and/or transmitting audio data (e.g., to server(s) 114 and/or to device 112 of user 141), may enable a two-way conversation via the smart speaker 179 and one or more remote devices or systems (such as device 112), and so forth. Thus, for example, if user 140 and/or user 142 may be in need of assistance, they may communicate with emergency services personnel, a building manager, or the like via the smart speaker 179.

It should be noted that for various critical rules, camera 177 may use one or more object detection/recognition models (or concept/theme detection models for identifying objects, events, or other semantic concepts or themes, e.g., "car," "person", "tree," "fire," "raining," "snowing," "party," "fighting," etc.). To illustrate, in order to detect a "fire" in image data from camera 177, camera 177 may store a detection model. This may include one or more images of fires (e.g., from different angles, in different scenarios, etc.), and may alternatively or additionally include feature set(s) derived from one or more images and/or video of fires, respectively. For instance, camera 177 may store a respective scale-invariant feature transform (SIFT) model, or a similar reduced feature set derived from image(s) of fires, which may be used for detecting additional fires in the visual information from camera 177 via feature matching. Thus, in one example, a feature matching detection algorithm employed by camera 177 may be based upon SIFT features. However, in other examples, different feature matching detection algorithms may be used, such as a Speeded Up Robust Features (SURF)-based algorithm, a cosine-matrix distance-based detector, a Laplacian-based detector, a Hessian matrix-based detector, a fast Hessian detector, etc.

The visual features used for detection of fires or other semantic content (such as different types of objects/items, events, weather, actions, occurrences, etc.) may include low-level invariant image data, such as colors (e.g., RGB (red-green-blue) or CYM (cyan-yellow-magenta) raw data (luminance values) from a CCD/photo-sensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like.

In one example, the camera 177 may perform an image salience detection process, e.g., applying an image salience model and then performing an image recognition algorithm over the "salient" portion of the image(s) or other image data/visual information from camera 177. Thus, in one example, visual features may also include a length to width ratio of an object, a velocity of an object estimated from a sequence of images (e.g., video frames), and so forth. Similarly, in one example, camera 177 may apply an object/item detection and/or edge detection algorithm to identify possible unique items in the visual information from camera 177 (e.g., without particular knowledge of the type of item; for instance, the object/edge detection may identify an object in the shape of a person in a video frame, without understanding that the object/item is a person). In this case, visual features may also include the object/item shape, dimensions, and so forth. In such an example, object/item recognition may then proceed as described above (e.g., with respect to the "salient" portions of the image(s) and/or video(s)).

In one example, the detection of objects/items or other areas of interest within images and their locations and/or position in the visual data of camera 177 may be in accordance with one or more machine learning algorithms (MLAs), e.g., one or more trained machine learning models (MLMs). For instance, a machine learning algorithm (MLA), or machine learning model (MLM) trained via a MLA may be for detecting a single object/item, or may be for detecting a single item from a plurality of possible items that may be detected via the MLA/MLM. For instance, the MLA (or the trained MLM) may comprise a deep learning neural network, or deep neural network (DNN), such as convolutional neural network (CNN), a generative adversarial network (GAN), a support vector machine (SVM), e.g., a binary, non-binary, or multi-class classifier, a linear or non-linear classifier, and so forth. In one example, the MLA/MLM may be a SIFT or SURF features-based detection model, as mentioned above. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on. In one example, the object detection MLM(s) may be trained at a network-based processing system (e.g., server(s) 114) and deployed to camera 177. It should also be noted that various pre-processing or post-recognition/detection operations may also be applied. For example, camera 177 may apply an image salience algorithm, an edge detection algorithm, or the like (e.g., as described above) where the results of these algorithms may include additional, or pre-processed input data for the one or more MLAs. Thus, in the example of FIG. 1, camera 177 may apply any number of image pre-processing algorithms to images/video from camera 177, and may apply at least one object detection/recognition MLA for detecting "fire," or a different object/item or other semantic content depending upon the particular critical rule trigger(s) in accordance with the configuration of camera 177, user preferences of user 140 and/or 141, etc.

In another example, a critical rule trigger may comprise a detection of the sound of breaking glass via smart speaker 179 (which may be associated with a breaking window), where camera 177 may learn of and activate itself in response to becoming aware of the critical rule trigger. For instance, camera 177 may be in an inactive/standby state, but may override privacy rules or other rules in effect that would otherwise cause camera 177 to be in the inactive/standby state, in order to activate itself. Camera 177 may then begin streaming image data to server(s) 114, device 112 of user 141, etc. Thus, for example, a homeowner, a building manager, an emergency responder, etc. may be better equipped to address the situation of a broken window with additional image data, which may indicate the presence of a burglar for instance, or which may indicate that the room 150 appears to be empty (for instance, the window may have been simply broken by a baseball from children playing in a nearby yard or a bird strike).

In the present example, the sound of breaking glass may be a critical rule (and the critical rule trigger may be the detection of the sound of breaking glass), which may be detected in accordance with one or more ML-based models. For example, various speech or other audio detection models may be trained from extracted audio features from one or more representative audio samples, such as low-level audio features, including: spectral centroid, spectral roll-off, signal energy, mel-frequency cepstrum coefficients (MFCCs), linear predictor coefficients (LPC), line spectral frequency (LSF) coefficients, loudness coefficients, sharpness of loudness coefficients, spread of loudness coefficients, octave band signal intensities, and so forth, wherein the output of the model in response to a given input set of audio features is a prediction of whether a particular semantic content is or is not present (e.g., the sound of breaking glass (or not), the phrase "call 9-1-1" (or not), etc.). For instance, in one example, each audio model may comprise a feature vector representative of a particular sound, or a sequence of sounds. In the present example, an audio model may be deployed to detect a critical rule trigger of smart speaker 179. For example, smart speaker 179 may apply new input data, e.g., captured audio data, to the one or more audio detection models. For instance, smart speaker 179 may detect the sound of breaking glass by extracting audio features from captured audio data, comparing the features to the model for "breaking glass," and determining that the sound of breaking glass is contained in the audio data when the distance between the extracted audio features and the model is less than a threshold (e.g., a Euclidean distance in a feature space having dimensions corresponding to the subject audio features, or the like). In one example, an audio detection model may comprise a speech detection and recognition model. In one example, the model may include natural language processing (NLP) which may enable the smart speaker 179 to interpret one or more commands. However, in another example, the model may be a more basic speech detection model for detecting a particular defined command from a smaller set of defined available commands (e.g., "call 9-1-1," "turn on," "turn off," "reduce volume," etc.).

In still another example, a fire may be detected via camera 177, e.g., a critical rule trigger, and alerted or otherwise learned by thermostat 158. In this case, thermostat 158 may determine that it should override other rules/settings and turn itself off. For instance, the temperature may be rising in the room 150 as a result of a fire and the thermostat 158 may continue to run in attempt to bring the temperature of the room 150 to the preferred setting of 76 degrees. In addition, the thermostat 158 may be part of a heating, ventilation, and air conditioning (HVAC) system that includes a blower to circulate air (in this case cooler air) as part of its inherent functionality of attempting to achieve a preferred temperature within the room 150. However, in this case, the additional air movement may inadvertently feed and promote the spreading of the fire, thereby making a dangerous situation worse. Thus, the thermostat 158 may determine that the thermostat 158 and/or the HVAC system in general should be turned off, at least within the room 150. In other words, the thermostat has taken an action that overrides its own operational rule(s) in response to the critical rule trigger of another network-connected sensor device (e.g., camera 177).

In another example, the thermostat 158 may have a critical rule trigger of the temperature exceeding 100 degrees Fahrenheit. Thus, for example, if the thermostat 158 has this critical rule triggered (e.g., a temperature of 101 degrees is detected), the thermostat 158 may notify other network-connected sensor devices in the room 150, or these devices may otherwise learn of the critical rule trigger of thermostat 158. In this case, camera 177 and smart speaker 179 may both be in inactive/standby states, but may determine to contravene their own privacy or other operational rules in order to become active and begin recording and/or transmitting image data and audio data, respectively. Thus, for example, image and audio data may be streamed to device 112, where user 141 may have a better sense of what is occurring in room 150. In particular, the user 141 may see the fire (if present), may hear any sounds, such as the calls of user 140 and/or user 142 for help, etc. In one example, to further protect the privacy and comply with the preferences of user 140 and/or user 142, the smart speaker 179 may first enter a "ready" state to enable the streaming of audio data and/or to enable a two-way conversation between smart speaker 179 and device 112. If the user 141 determines that an emergency likely exists, user 141 may then further request an image data feed from camera 177, which may be fulfilled by camera 177. In other words, the camera 177 does not immediately stream image data, but enters a state in which requests for an image data feed will be honored (e.g., whereas in the inactive/standby state, such a request would otherwise be denied in accordance with the privacy and/or other operational rules of camera 177).

In still another example, door 154 may have an operational rule that the door 154 is to remain closed and locked to the outside of room 150 at all times when guests (e.g., user 140 and/or user 142) are present in the room 150. However, in response to learning of a critical rule trigger of camera 177 (e.g., the detection of a "fire", etc.), a critical rule trigger of smart speaker 179 (e.g., screams, repetition of the word "help," etc.), a critical rule trigger of thermostat 158 (e.g., temperature over 95 degrees, etc.), the door 154 may determine that it should override its own operational rule(s) and unlock and/or open itself. For instance, the door 154 may comprise an electronic lock that may unlock itself. In another example, the door 154 may alternatively or additionally include a self-opening/self-closing mechanism, e.g., an electro-mechanical piston, arm, etc. that can be controlled by the door 154 to cause the door 154 to put itself into an open position to allow for easy exit and entry.

It is again noted that in inactive/standby states (or similar), image data and audio data are only used to determine if a critical rule is triggered, and are not retained any longer than necessary to make such a determination. In addition, in one example, no image data or audio data leave the smart camera 177 and smart speaker 179 in such state(s). In other words, the actual image data or audio data is not available to an owner or manager of the premises 190, or the like. In one example, smart camera 177, smart speaker 179, and/or other devices may be certified as complying with certain privacy and security guarantees, such as by a third party auditor or certification authority. For instance, the manufacturers or others associated with the production and use of such devices may guarantee that user privacy is maintained and that no image data or audio data is retained for more than a duration of 1 minute, 2 minutes, 5 minutes, etc., no image data or audio data is transmitted, etc., e.g., when in an inactive/standby state, or the like.

As noted above, in one example, camera 177, smart speaker 179, and other devices may not immediately stream image, audio, or other data when activated in response to a critical rule trigger of a peer device, but may begin recording and storing such data internally, or may stream such data to another device, such as device controller 195, server(s) 114, which may store such data in DB(s) 115, etc. In one example, the data may be accessible upon request, e.g., by user 141 via device 112, or the like. In one example, the data may be stored in an encrypted format, where a key usable to decrypt the encrypted data may be provided upon request, and where the access may be logged for auditing. Thus, for example, user 141 may seek to assess how a fire started, but may first seek the permission of user 140 and/or user 142 to access stored video. If the permission is denied and the user 141 still attempts to access the video, the attempt may be logged and is auditable. On the other hand, if permission is granted, the user 141 may access the video, and the accessing may be recorded in accordance with the permission in an access log.

In one example, the network-connected electronic devices may report their actions to device controller 195 and/or server(s) 114, which may be recorded in an action log. Thus, a network-connected electronic device may report each time that it decides to violate its own operational rules in response to a critical rule trigger of a peer network-connected sensor device. In one example, a responsible user, such as user 141 (e.g., management personnel of premises 190) may access the action log and may determine whether any instances of network-connected electronic devices overriding operational rules in response to peer critical rule triggers are incorrect (e.g., not preferred by the user 141, by the guests, e.g., user 140 and/or user 142, etc.). For instance, user 141 may utilize a user interface to view and select one or more entries in the action log, and may provide an input to indicate that these actions were incorrect. Thereafter, device controller 195 and/or server(s) 114 may send a confirmation or correction of the action to the affected network-connected electronic devices. For instance, a guest may prefer room cameras (such as camera 177) to stay in the inactive state, regardless of how significant of an emergency may be indicated by a critical rule trigger of another device (such as smart speaker 179). In response, the camera 177 may update an entry in a peer-device critical rule table (e.g., stored by the camera 177 itself) to indicate that for the critical rule trigger of the smart speaker 179, to take no action. In an example in which the correction is a result of guest preferences, this may be applicable only to the current pertinent guests. In an example in which the correction is a result of a preference of user 141, this may be generally applicable for all future instances. Accordingly, in future instance in which the camera 177 learns of the critical rule trigger of the smart speaker 179, if the camera 177 is in the inactive/standby state, the camera 177 nevertheless will not be active and record and/or transmit images or videos.

It should be noted that the foregoing are just several examples of the present disclosure for activating a function of a network-connected electronic device in response to determining that a triggering of a critical rule of a network-connected sensor device has occurred in a monitored area. Thus, it should be noted that in other, further, and different examples, aspects described above with respect to server(s) 114 may alternatively or additionally be provided by AS 104. Similarly, functions or operations described in connection with server(s) 114 may alternatively or additionally be provided by device controller 195, and vice versa. In addition to the foregoing, various other features of the present disclosure may be provided via the system 100, such as enabling user 140 to check-out at a departure time via device 110, to receive any additional charges incurred during the use of premises 190, to approve and/or to pay the additional charges, and so on.

In addition, although FIG. 1 is illustrated and described in connection with an example of a guest lodging (e.g., a hotel), the present disclosure is broadly applicable to various other types of locations, such as owner or tenant occupied home, a vacation rental home, an office, a university building or other public spaces (which can be indoor or outdoor), etc. As just one further example, a home may have an electronic pet door that has an operational rule (e.g., set by the homeowner) that the pet door is to remain open between 8:00 AM and 8:00 PM and that when a pet is detected to be in the house or is detected to enter the house after 8:00 PM, that the pet door is to remain closed (so as to keep the pet inside). However, if a critical rule trigger of a camera, a smart speaker, a thermostat, or another network-connected sensor device is notified to the pet door, the pet door may determine that it should override its own rule(s) and change to an open and/or an unlocked state, e.g., in order to allow the pet to escape the monitored area.

It should also be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. In addition, the network-connected electronic devices may include various other types of electronic devices and/or sensors, such as a light detection and ranging (LiDAR) unit, and so forth. In addition, the system 100 may include other network elements (not shown) such as border elements, routers, switches, policy servers, security devices, gateways, a content distribution network (CDN) and the like. For example, portions of network 102 and/or access networks 120 and 122 may comprise a content distribution network (CDN) having ingest servers, edge servers, and the like. Similarly, although only two access networks 120 and 122 are shown, in other examples, access networks 120 and/or 122 may each comprise a plurality of different access networks that may interface with network 102 independently or in a chained manner. For example, server(s) 114 and gateway 192 may reach network 102 via different access networks, and so forth. Thus, these and other modifications are all contemplated within the scope of the present disclosure.

Figure 2:
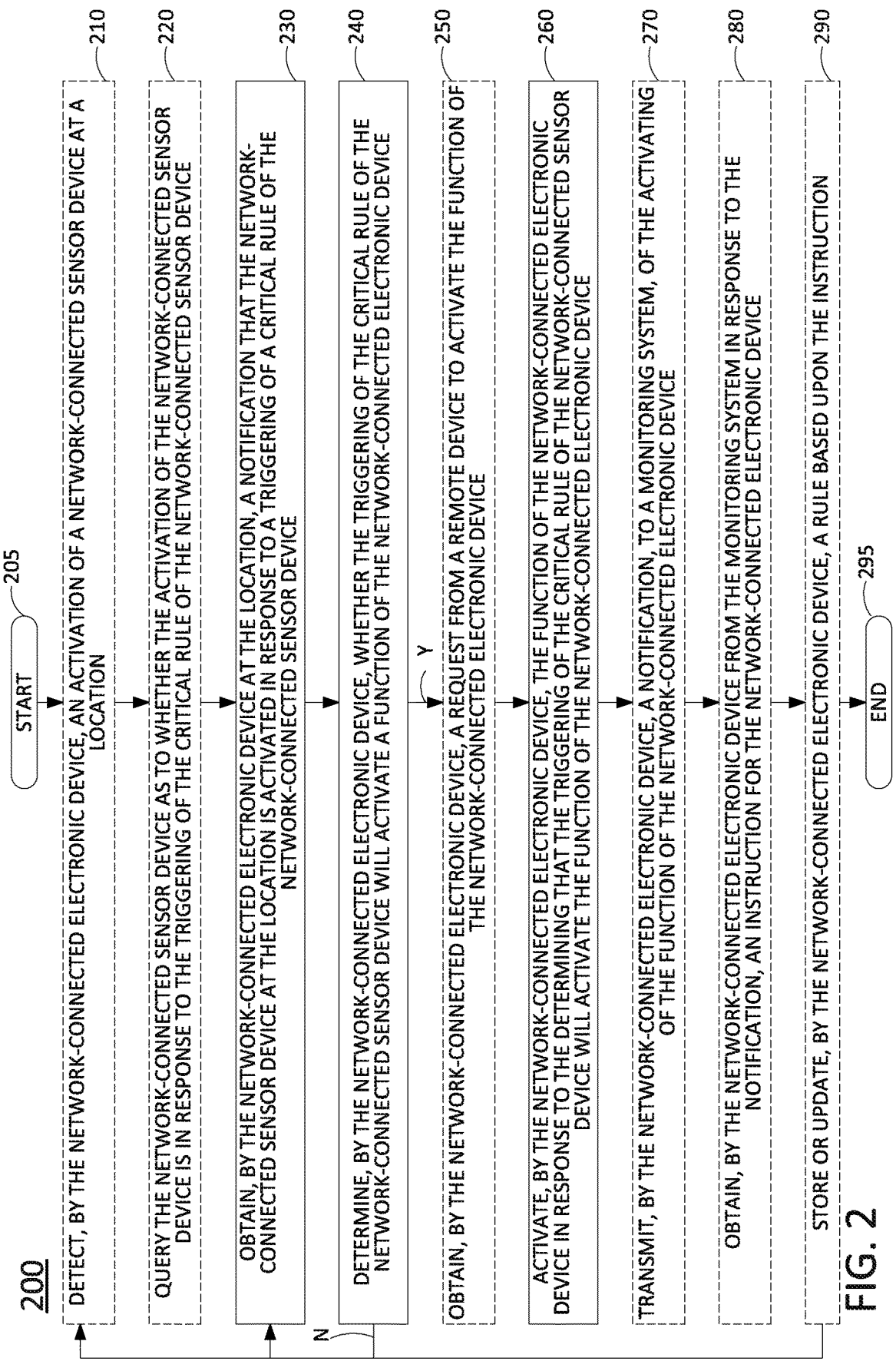
FIG. 2 illustrates a flowchart of an example method for activating a function of a network-connected electronic device in response to determining that a triggering of a critical rule of a network-connected sensor device has occurred in a monitored area.

FIG. 2 illustrates a flowchart of an example method 200 for activating a function of a network-connected electronic device in response to determining that a triggering of a critical rule of a network-connected sensor device has occurred in a monitored area. In one example, the method 200 is performed by a network-connected electronic device, such as illustrated in FIG. 1, or the like, or any one or more components thereof, or by any one or more of such devices in conjunction with one another and/or in conjunction with other devices and/or components of system 100 of FIG. 1, such as server(s) 114, device controller 195, etc. In one example, the steps, functions, or operations of method 200 may be performed by a computing device or processing system, such as computing system 300 and/or hardware processor element 302 as described in connection with FIG. 3 below. For instance, the computing system 300 may represent any one or more components of the system 100 that is/are configured to perform the steps, functions and/or operations of the method 200. Similarly, in one example, the steps, functions, or operations of the method 200 may be performed by a processing system comprising one or more computing devices collectively configured to perform various steps, functions, and/or operations of the method 200. For instance, multiple instances of the computing system 300 may collectively function as a processing system. For illustrative purposes, the method 200 is described in greater detail below in connection with an example performed by a processing system. The method 200 begins in step 205 and may proceed to optional step 210 or to step 230.

At optional step 210, the processing system (e.g., of a network-connected electronic device, which itself may comprise a network-connected sensor device) may detect an activation of a network-connected sensor device. For instance, the network-connected sensor device may be a peer device of the network-connected electronic device, where both devices are deployed at a common location (broadly a monitored area), such as within a home, in a hotel room, in an office, etc. For example, the processing system may be in communication with the network-connected sensor device via a peer-to-peer wireless link and/or via a wired or wireless local area network (LAN) and may receive an indication or may otherwise detect the activation of the network-connected sensor device.

At optional step 220, the processing system may query the network-connected sensor device as to whether the activation of the network-connected sensor device is in response to the triggering of a critical rule of the network-connected sensor device. The network-connected sensor device may comprise for example, a smart camera, a smart speaker, a network-connected thermostat and/or HVAC system, a LiDAR unit, and so forth. The network-connected electronic device may similarly comprise a network-connected sensor device and/or a non-sensor device, such as an electronically controlled door, window, light or lighting system, and so forth.

At step 230, the processing system obtains a notification that the network-connected sensor device at the location is activated in response to a triggering of a critical rule of the network-connected sensor device. For instance, in one example, the notification may be in response to the query of optional step 220. In another example, the network-connected sensor device may proactively transmit the notification to one or more peer network-connected electronic devices when it activates itself in response to a critical rule trigger. For instance, the critical rule may comprise a safety rule of the network-connected sensor device that supersedes non-critical operational rules of the network-connected sensor device, e.g., where the non-critical operational rules include at least one privacy rule. The critical rule may comprise, for example, a rule to activate (e.g., enter an active state of data recording and/or transmission) in response to a detection of an object, item, sound(s), word(s), or other semantic content in image or audio data, a measurement of an environmental condition above a threshold, and so forth. Accordingly, a critical rule trigger may comprise, for example, the detection of such an object, item, sound(s), word(s), or other semantic content, an environmental condition, etc.

At step 240, the processing system may determine whether the triggering of the critical rule of the network-connected sensor device will cause the processing system itself to activate one of its own functions in the monitored area. For instance, if the processing system/network-connected electronic device comprises a camera and the network-connected sensor device comprises a smart speaker, step 240 may include determine whether the triggering of the critical rule of the smart speaker will cause the activation of a function of the camera (e.g., to begin capturing and/or transmitting images and/or video, where the camera is previously in an inactive state), and similarly for other network-connected electronic devices, and for different combinations of network-connected electronic devices and network-connected sensor devices. In one example, the processing system may maintain a peer device critical rule table, or list. For instance, the table may indicate for each critical rule of each peer-device, a corresponding action for the processing system to take when the network-connected electronic device is in an inactive state, a standby state, or the like, in accordance with at least one operational rule of the network-connected electronic device. For instance, if the network-connected electronic device is a camera, the determination may be either to activate a function of the camera (e.g., to collect, store, and/or transmit image data), or to remain in the inactive state (e.g., to do nothing in response to the critical rule trigger of a peer device). In one example, a default response may be for the network-connected electronic device to activate a function (e.g., to violate the operational rule(s) of the network-connected electronic device which would otherwise indicate for the network-connected electronic device to be in an inactive state) in response to learning of the critical rule trigger of a peer device. However, the processing system may receive instructions, e.g., corrections, which may alter this default behavior and to store a different action for a peer device critical rule within the peer device critical rule table/list that may be maintained by the processing system. When it is determined that the triggering of the critical rule of the network-connected sensor device is to activate a function of the network-connected electronic device, the method 200 may proceed to step 260 or to optional step 250.

At optional step 250, the processing system may obtain a request from a remote device to activate the function of the network-connected electronic device. For instance, in one example, the processing system may not immediately activate the function, but may enter a state in which requests to activate will be honored (e.g., whereas in the inactive/standby state, such a request would otherwise be denied in accordance with the privacy rules and/or other operational rules of the processing system/network-connected electronic device). For example, a camera may not immediately begin storing or streaming video, but may permit this function to now be activated on command (e.g., per a request that may be received at optional step 250). In this regard, it should be noted that prior to step 240, the network-connected electronic device (e.g., the processing system) may be in a first state in accordance with at least one operational rule (e.g., at least one privacy rule) of the network-connected electronic device. For instance, when the network-connected electronic device is in the first state, requests from remote devices to activate the function of the network-connected electronic device may be denied. However, the network-connected electronic device (e.g., the processing system) at step 250 may now be in a different state, e.g., in which such a request may be fulfilled.

At step 260, the processing system activates the function of the network-connected electronic device in response to the determining that the triggering of the critical rule of the network-connected sensor device will cause the processing system itself to activate one of its own functions in the monitored area. In one example, the activating may be further in response to a request that may be received at optional step 250. In one example, the function of the network-connected electronic device may comprise taking and recording first sensor data (e.g., image data, audio data, etc.). In another example, the function of the network-connected electronic device may comprise taking an action, e.g., opening a device, closing a device, locking a device, unlocking a device, moving a device, reconfiguring a setting on a device, sending a control signal to a device, sending a communication message, setting up a communication channel, etc. To illustrate, in an example in which the network-connected sensor device comprises a smart speaker, the critical rule may comprise at least one of: a detected sound level above a threshold sound level, a particular detected instruction, or a particular detected sound (e.g., a sound of breaking glass, a gunshot, an explosion, or the like, a detection of the phrase "call 9-1-1," the word "help," wherein the sound level is above a threshold, a repeated utterance of "help, help, help . . . ", etc.). In addition, in such an example, the network-connected electronic device may comprise a camera, where the function of the network-connected electronic device may comprise at least one of: storing one or more images of the location, or transmitting (e.g., streaming) the one or more images of the location, such as to a monitoring server, an endpoint device of a property owner or manager, emergency responders, etc.

In another example in which the network-connected sensor device comprises a camera, the critical rule trigger may comprise a detection of a fire condition and the network-connected electronic device may comprise a smart speaker. In such case, step 260 may comprise activating a function comprising at least one of: storing sound data of the location, transmitting the sound data of the location, or enabling a two-way conversation via the smart speaker and at least one remote device. It should be noted that in one example, the fire condition may be detected via a detection model deployed locally on the camera, e.g., where one or more images obtained via the camera are input to the detection model and are not retained by the camera or transmitted to any other devices when the fire condition is not detected. In other words, the captured images are only used locally by the camera to detect the fire condition, but these captured images will not be permanently stored or transmitted to another entity.

In another example, the network-connected sensor device may comprise a smart speaker and the critical rule may comprise at least one of: a detected sound level above a threshold sound level, a particular detected instruction, or a particular detected sound. In addition, in such an example, the network-connected electronic device may comprise an electronically-controlled door or an electronically-controlled window. For example, the function to be activated may comprise opening or unlocking the electronically-controlled door or the electronically-controlled window, closing or locking the electronically-controlled door or the electronically-controlled window, or the like. In still another example, the network-connected sensor device may comprise a camera and the critical rule may comprise a detection of a fire condition. In addition, in such an example, the network-connected electronic device may comprise an electronically-controlled door or an electronically-controlled window (e.g., with the function comprising opening or unlocking the electronically-controlled door or the electronically-controlled window, closing or locking the electronically-controlled door or the electronically-controlled window, or the like). An electronically-controlled door may comprise, for example a locking door of an office, a guest room in a hotel, a university classroom, and so forth. In one example, an electronically-controlled door may comprise a pet door. Still other examples may include a thermostat and/or HVAC turning off when a critical rule of a camera is triggered, and conversely, a camera turning on when a critical rule of a thermostat and/or HVAC is triggered, and so forth.

At optional step 270, the processing system may transmit a notification, e.g., to a monitoring system or management server, of the activating of the function of the network-connected electronic device at step 260. In one example, the monitoring system is to authorize an access to first sensor data collected by the processing system/network-connected electronic device as part of or following the activation at step 260. For instance, in one example, the first sensor data may be recorded in an encrypted format, and the monitoring system may provide an encryption key that enables decrypting of the first sensor data that is recorded in the encrypted format into an unencrypted format for the access (e.g., by monitoring personnel, emergency responders, a property owner or manager, individuals at the location having their images or audio data captured in the first sensor data, etc.).

At optional step 280, the processing system may obtain, from the monitoring server or system in response to the notification, an instruction for the network-connected electronic device (e.g., for the processing system) to either: (1) when in the first state, to activate the function of the network-connected electronic device in response to a further notification that the network-connected sensor device at the location is activated in response to the triggering of the critical rule of the second sensor device, or (2) when in the first state, to remain in the first state in response to the further notification.

At optional step 290, the processing system may store or update a rule based on the instruction, e.g., a rule in a peer device critical rule table, or list, such as described above. In one example, the method 200 may return to optional step 210 or to step 230, or may proceed to step 295. For instance, the method 200 may return to step 230 to obtain a further notification of a critical rule trigger of the network-connected sensor device (e.g., for a different time/different instance) and may then determine at step 240 to remain in the first state or to proceed to subsequent steps to activate the function of the network-connected electronic device.

Following step 260, or any of optional steps 270-290, the method 200 may proceed to step 295. At step 295 the method 200 ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200, such as steps 210-260, steps 210-290, steps 230-260, etc. In one example, the method 200 may further include the processing system (e.g., the network-connected electronic device) determining a condition of the location, and placing itself in the first state (e.g., inactive/standby, or the like) based upon the condition and one or more operational rules (e.g., privacy or other rule(s)) of the network-connected electronic device. In one example, the method 200 may be expanded or modified to include steps, functions, and/or operations, or other features described above in connection with the example(s) of FIG. 1, or as described elsewhere herein. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the respective methods can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 3 depicts a high-level block diagram of a computing system 300 (e.g., a computing device or processing system) specifically programmed to perform the functions described herein. For example, any one or more components or devices illustrated in FIG. 1, or described in connection with FIG. 2, may be implemented as the computing system 300. As depicted in FIG. 3, the computing system 300 comprises a hardware processor element 302 (e.g., comprising one or more hardware processors, which may include one or more microprocessor(s), one or more central processing units (CPUs), and/or the like, where the hardware processor element 302 may also represent one example of a "processing system" as referred to herein), a memory 304, (e.g., random access memory (RAM), read only memory (ROM), a disk drive, an optical drive, a magnetic drive, and/or a Universal Serial Bus (USB) drive), a module 305 for activating a function of a network-connected electronic device in response to determining that a triggering of a critical rule of a network-connected sensor device has occurred in a monitored area, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 302 is shown, the computing system 300 may employ a plurality of hardware processor elements. Furthermore, although only one computing device is shown in FIG. 3, if the method(s) as discussed above is implemented in a distributed or parallel manner for a particular illustrative example, e.g., the steps of the above method(s) or the entire method(s) are implemented across multiple or parallel computing devices, then the computing system 300 of FIG. 3 may represent each of those multiple or parallel computing devices. Furthermore, one or more hardware processor elements (e.g., hardware processor element 302) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 302 can also be configured or programmed to cause other devices to perform one or more operations as discussed above. In other words, the hardware processor element 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 305 for activating a function of a network-connected electronic device in response to determining that a triggering of a critical rule of a network-connected sensor device is to instantiate the activation of the function of the network-connected electronic device (e.g., a software program comprising computer-executable instructions) can be loaded into memory 304 and executed by hardware processor element 302 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 302) executing the computer-readable instructions relating to the above described method(s) can be perceived as a programmed processor or a specialized processor. As such, the present module 305 for activating a function of a network-connected electronic device in response to determining that a triggering of a critical rule of a network-connected sensor device has occurred in a monitored area (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
obtaining, by a network-connected electronic device at a location, a notification that a network-connected sensor device at the location is activated in response to a triggering of a critical rule of the network-connected sensor device, wherein the network-connected electronic device is distinct from the network-connected sensor device, wherein the network-connected sensor device comprises a speaker, wherein the critical rule comprises at least one of: a detected sound level above a threshold sound level, a particular detected instruction, or a particular detected sound, and wherein the network-connected electronic device comprises a camera;
determining, by the network-connected electronic device, whether the triggering of the critical rule of the network-connected sensor device will activate a function of the network-connected electronic device, wherein the function of the network-connected electronic device comprises at least one of:
storing one or more images of the location; or
transmitting the one or more images of the location; and
activating, by the network-connected electronic device, the function of the network-connected electronic device in response to the determining that the triggering of the critical rule of the network-connected sensor will activate the function of the network-connected electronic device.

2. The method of claim 1, wherein the obtaining the notification comprises:
detecting an activation of the network-connected sensor device; and
querying the network-connected sensor device as to whether the activation of the network-connected sensor device is in response to the triggering of the critical rule of the network-connected sensor device.

3. The method of claim 2, wherein the notification is obtained in response to the querying of the network-connected sensor device.

4. The method of claim 1, further comprising:
prior to the activating, obtaining a request from a remote device to activate the function of the network-connected electronic device, wherein the activating of the function of the network-connected electronic device is in response to the request.

5. The method of claim 1, wherein, prior to the determining, the network-connected electronic device is in a first state in accordance with at least one operational rule of the network-connected electronic device.

6. The method of claim 5, wherein when the network-connected electronic device is in the first state, a request from a remote device to activate the function of the network-connected electronic device is denied by the network-connected electronic device.

7. The method of claim 5, wherein the at least one operational rule is associated with at least one of:
the location; or
a user at the location.

8. The method of claim 5, wherein the at least one operational rule comprises at least one privacy rule.

9. The method of claim 5, further comprising:
transmitting a second notification, to a monitoring system, of the activating of the function of the network-connected electronic device in response to the determining that the triggering of the critical rule of the network-connected sensor device will activate the function of the network-connected electronic device.

10. The method of claim 9, further comprising:
obtaining, from the monitoring system in response to the second notification, an instruction for the network-connected electronic device to either:
when in the first state, to activate the function of the network-connected electronic device in response to a further notification that the network-connected sensor device at the location is activated in response to the triggering of the critical rule; or
when in the first state, to remain in the first state in response to the further notification.

11. The method of claim 10, further comprising:
storing a rule based upon the instruction;
obtaining the further notification; and
in response to the further notification and in accordance with the rule, performing one of:
activating the function of the network-connected electronic device; or
determining to remain in the first state.

12. The method of claim 9, wherein the function of the network-connected electronic device comprises:
recording first sensor data.

13. The method of claim 12, wherein the monitoring system is to authorize an access to the first sensor data.

14. The method of claim 13, wherein the first sensor data is recorded in an encrypted format, and wherein the monitoring system is to provide an encryption key that enables decrypting of the first sensor data that is recorded in the encrypted format into an unencrypted format for the access.

15. The method of claim 1, wherein the critical rule is a safety rule of the network-connected sensor device that supersedes non-critical operational rules of the network-connected sensor device, wherein the non-critical operational rules include at least one privacy rule.

16. A non-transitory computer-readable medium storing instructions that, when executed by a processing system including at least one processor of a network-connected electronic device, cause the processing system to perform operations, the operations comprising:
obtaining, at a location, a notification that a network-connected sensor device at the location is activated in response to a triggering of a critical rule of the network-connected sensor device, wherein the network-connected electronic device is distinct from the network-connected sensor device, wherein the network-connected sensor device comprises a speaker, wherein the critical rule comprises at least one of: a detected sound level above a threshold sound level, a particular detected instruction, or a particular detected sound, and wherein the network-connected electronic device comprises a camera;
determining whether the triggering of the critical rule of the network-connected sensor device will activate a function of the network-connected electronic device, wherein the function of the network-connected electronic device comprises at least one of:
storing one or more images of the location; or transmitting the one or more images of the location; and activating the function of the network-connected electronic device in response to the determining that the triggering of the critical rule of the network-connected sensor will activate the function of the network-connected electronic device.

17. A network-connected electronic device, comprising:
at least one processor; and
a non-transitory computer-readable medium storing instructions that, when executed by the at least one processor, cause the at least one processor to perform operations, the operations comprising:
  obtaining, at a location, a notification that a network-connected sensor device at the location is activated in response to a triggering of a critical rule of the network-connected sensor device, wherein the network-connected electronic device is distinct from the network-connected sensor device, wherein the network-connected sensor device comprises a speaker, wherein the critical rule comprises at least one of: a detected sound level above a threshold sound level, a particular detected instruction, or a particular detected sound, and wherein the network-connected electronic device comprises a camera;
  determining whether the triggering of the critical rule of the network-connected sensor device will activate a function of the network-connected electronic device, wherein the function of the network-connected electronic device comprises at least one of:
    storing one or more images of the location; or
    transmitting the one or more images of the location; and
  activating the function of the network-connected electronic device in response to the determining that the triggering of the critical rule of the network-connected sensor will activate the function of the network-connected electronic device.

18. The network-connected electronic device of claim 17, wherein the obtaining the notification comprises:
  detecting an activation of the network-connected sensor device; and
  querying the network-connected sensor device as to whether the activation of the network-connected sensor device is in response to the triggering of the critical rule of the network-connected sensor device.

19. The network-connected electronic device of claim 18, wherein the notification is obtained in response to the querying of the network-connected sensor device.

20. The network-connected electronic device of claim 17, wherein the operations further comprise:
  prior to the activating, obtaining a request from a remote device to activate the function of the network-connected electronic device, wherein the activating of the function of the network-connected electronic device is in response to the request.

* * * * *